United States Patent
Heilmann et al.

(10) Patent No.: US 8,061,733 B2
(45) Date of Patent: Nov. 22, 2011

(54) SAFETY SYSTEM

(75) Inventors: Gernod Heilmann, Hemmingen (DE); Huu-Dat Nguyen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 595 days.

(21) Appl. No.: 11/886,608

(22) PCT Filed: Jan. 25, 2006

(86) PCT No.: PCT/EP2006/050441
§ 371 (c)(1), (2), (4) Date: Feb. 6, 2009

(87) PCT Pub. No.: WO2006/100138
PCT Pub. Date: Sep. 28, 2006

(65) Prior Publication Data
US 2009/0212543 A1 Aug. 27, 2009

(30) Foreign Application Priority Data

Mar. 23, 2005 (DE) .......................... 10 2005 013 450

(51) Int. Cl.
*G01R 31/00* (2006.01)

(52) U.S. Cl. .......... 280/735; 73/1.37; 324/503; 324/523
(58) Field of Classification Search ................. 280/735; 340/436, 438, 441, 467; 701/45; 73/1.01, 73/1.37, 1.57; 324/503, 523, 537, 555, 750.3
See application file for complete search history.

(56) References Cited

U.S. PATENT DOCUMENTS

| | | | | |
|---|---|---|---|---|
| 4,061,402 A | * | 12/1977 | Peterson et al. | 303/122.06 |
| 4,243,971 A | * | 1/1981 | Suchowerskyj et al. | 340/438 |
| 4,325,350 A | | 4/1982 | Bauer et al. | |
| 4,697,142 A | * | 9/1987 | Frushour | 324/537 |
| 4,947,105 A | * | 8/1990 | Unger et al. | 324/750.3 |
| 5,631,602 A | * | 5/1997 | Kearney et al. | 330/2 |
| 5,640,095 A | * | 6/1997 | Beier et al. | 324/522 |
| 5,666,065 A | * | 9/1997 | Ravas et al. | 324/762.09 |
| 6,308,554 B1 | * | 10/2001 | Mattes et al. | 73/1.37 |
| 6,343,498 B1 | * | 2/2002 | Oba et al. | 73/1.57 |
| 7,155,323 B2 | * | 12/2006 | Ishida | 701/36 |
| 7,255,015 B2 | * | 8/2007 | McBride et al. | 73/862.474 |
| 2002/0093360 A1 | * | 7/2002 | Nagata | 324/765 |

FOREIGN PATENT DOCUMENTS

| | | |
|---|---|---|
| EP | 0 421 573 | 4/1991 |
| JP | 03 028046 | 2/1991 |
| JP | 3-028046 | 2/1991 |
| JP | 3-135859 | 6/1991 |
| JP | 2002-524742 | 8/2002 |
| JP | 2005 009924 | 1/2005 |
| JP | 2005-009924 | 1/2005 |
| WO | WO 00/14555 | 3/2000 |

OTHER PUBLICATIONS

An essay by W. Suchowerskyj "Evolution en matière de détecteurs de choc" [Developments in impact detectors] in Ingénieurs de l'Automobile 1141 (1982) No. 6, pp. 69-77, Paris.

* cited by examiner

*Primary Examiner* — Paul N Dickson
*Assistant Examiner* — Timothy Wilhelm
(74) *Attorney, Agent, or Firm* — Kenyon & Kenyon LLP

(57) ABSTRACT

A safety system for vehicle occupants includes a control unit and sensors situated remotely from the control unit and connected via conductors to the control unit. The safety system encompasses means for testing the sensors and the conductors to the sensors.

11 Claims, 1 Drawing Sheet

SAFETY SYSTEM

BACKGROUND INFORMATION

A safety system is known, for example, from the essay by W. Suchowerskyj "Evolution en matiére de détecteurs de choc" [Developments in impact detectors] in Ingénieurs de l'Automobile 1141 (1982) No. 6, pp. 69-77, Paris. The safety system encompasses a sensor suite having a plurality of sensors, at least one control unit, and a plurality of restraint means, for example airbags and/or belt tensioners. The sensor suite of a safety system of this kind serves to sense and evaluate an accident situation. On the basis of the data obtained, the points in time for triggering of the appropriate restraint means are determined.

Acceleration sensors, but also rotation-rate sensors and pressure sensors, are common today. They serve to measure acceleration, rotation rate, or an intrusion into the vehicle in the various axes, and thus to detect the progression and severity of an accident. The sensors can be disposed in a central control unit or also as external components in the front region or the side regions of the vehicle. As with all components of a safety systems, monitoring of these sensors is of critical importance in terms of the reliability and availability of the entire safety system. The safety system can provide its intended protective effect only if fault-free operation of the sensor suite is ensured.

The external sensors are usually connected via a two-wire conductor to a control unit. The conductor supplies the sensors with electrical energy from the control unit, and also serves to transfer digital data from the sensors to the control unit. For that purpose, the data are transmitted from the sensors, preferably serially, as current values. The monitoring of such external sensors is of particular importance because short circuits or interruptions are always a possibility in the case of a wiring harness routed in a vehicle. The monitoring system must on the one hand protect the electronic components, i.e. in particular in the context of short circuits to ground or to battery voltage. On the other hand, it is important specifically in the case of external components to detect the actual cause of a fault as accurately as possible, so that a repair can be quickly and cost-effectively performed in the shop.

With the monitoring that is common today, an analog measurement of the voltage on the supply conductor is performed for this purpose. Short circuits to ground or to the battery can be detected thereby because the potential then deviates from the normal supply voltage of the external sensors (e.g. 6 V). If the external sensor is sending no data, however, it is impossible to state unequivocally whether this is caused by a conductor interruption or because of an internal defect in the sensor. With the method hitherto usual, i.e. measurement of the voltage on the connecting conductor to the external sensors, it is possible to detect certain fault patterns. If the peripheral sensor is no longer sending data, a diagnosis is made according to the following formula: Measure the voltage on the connecting conductor. If it is distinctly lower than the nominal supply level to the sensors, this suggest a short circuit to ground. If it is above the threshold, however, the power supply to the sensor is switched off and another measurement is performed. The connecting conductor should now be at zero potential. If a voltage is nonetheless measured, this suggests a short circuit to the battery. If no voltage is measured, however, a conductor interruption or a sensor defect is deduced as the cause of the sensor fault.

This type of diagnosis thus makes it possible to classify essentially three fault patterns: short circuit to ground, short circuit to battery, conductor interruption or sensor with internal defect. While the first two fault types are unequivocally attributable to the vehicle's wiring harness, this is not immediately possible in the case of the third fault category. If this fault is recorded in the fault memory, testing must be performed in the shop to discover whether the fault is to looked for in the vehicle's wiring harness or in the sensor itself. This, however, is time-consuming and expensive.

SUMMARY OF THE INVENTION

The present invention makes possible a faster and more targeted detection of the cause of a fault, and can therefore contribute to a reduction in the complexity and cost of repairs. This is made possible by the fact that the safety system encompasses means for testing the sensors and the conductors leading to the sensors. These means encompass current measurement means that apply a test current to the sensors and to the conductors. The test current also flows through a resistor connected in series with the sensor, and produces therein a voltage drop that is amplified in an amplifying device and evaluated in a control unit.

DETAILED DESCRIPTION

Figure 1:
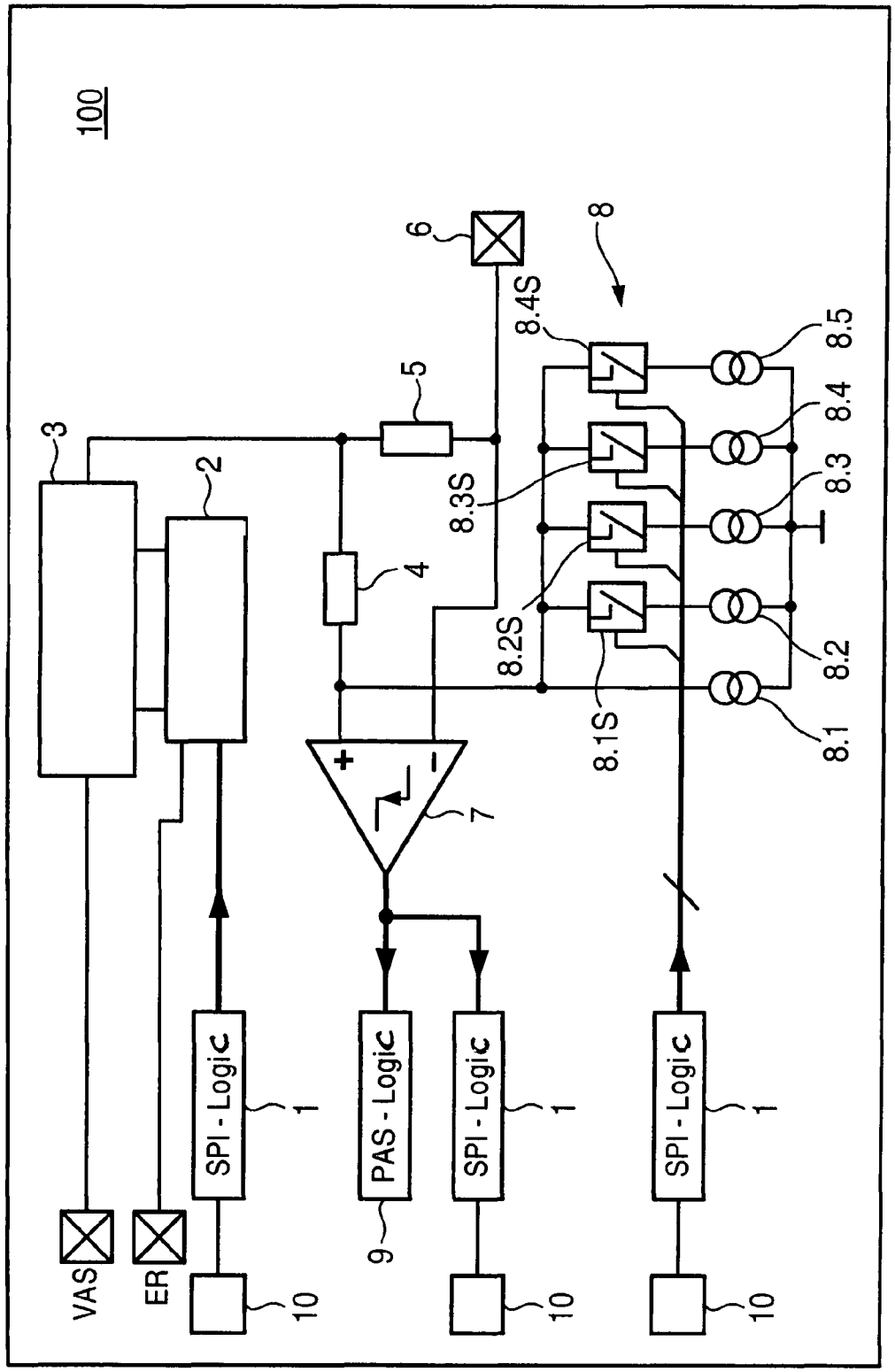
FIG. 1 shows a block diagram of a safety system.

FIG. 1 shows, in a block diagram, the schematic configuration of a so-called peripheral acceleration sensor (PAS) interface 100, in an exemplary embodiment of the present invention. Interface 100 encompasses a first functional module 1, also referred to as a serial peripheral interface (SPI) logic unit, that is connected to a control unit 10. This functional module 1, and control unit 10, are depicted several times in FIG. 1 for better clarity. Functional module 1 is connected to driver stage 2 of an output stage 3. Functional module 1 is also connected to the output of an amplifier circuit 7. Lastly, functional module 1 is connected to a reference current source 8 that is made up of multiple reference voltage sources 8.1, 8.2, 8.3, 8.4, 8.5. One output of output stage 3 is connected via a resistor 5 to sensor 6, and via a further resistor 4 to the non-inverting input of amplifying device 7. This input is also connected to one terminal of reference voltage source 8.1, the second terminal of which is connected to ground. The non-inverting input of amplifying device 7 is furthermore connected to one pole of each of switching elements 8.1S that are wired in series with reference current sources 8.2, 8.3, 8.4, 8.5. The inverting input of amplifying device 7 is connected to the connecting point between resistor 5 and sensor 6. The output of amplifying device 7 is furthermore connected to a functional module 9. The control unit supplies external sensors 6 via a two-wire conductor.

Data are transferred in the form of current pulses. A current interface is provided for this purpose. Sensor 6 imprints the binary data stream in the form of current pulses. Wired into sensor 6 for this purpose is a constant-current sink that increases the current on the conductor to the control unit. When this current sink raises the total current above the baseline requirement of sensor 6, this is detected. This of course requires a knowledge of the baseline requirement of sensor 6. The current is measured on the part of the control unit by way of a measuring resistor (resistor 5). The voltage drop across resistor 5 can be determined by way of amplifying device 7, preferably an operational amplifier. If the current rises above the baseline load of sensor 6, this is detected by way of the Schmitt trigger built into amplifying device 7, and the serial data stream transferred in the form of current pulses is thus decoded. Because of the plurality of different sensors 6 each having its baseline requirement, resistor 5 used for current measurement must be adaptable to the total current requirement of sensor 6. Whereas external measuring resistors were provided in the case of older safety systems, in the latest safety systems these resistors are integrated and programmable. Advantageously, the measurement range can be adjustable from approximately 3 mA in each case, in a range from approximately 3 mA to approximately 30 mA.

In hitherto usual safety systems, the output of a current measuring amplifier is connected to a logic circuit that receives the serial data stream. Here, in accordance with the Manchester code that is frequently used, the data and clock information are separated from one another and processed. All that is required for measurement of the current in the connecting conductor is that control unit be able to read out the output of amplifying device 7. For that purpose, the output of the amplifying device is directed to a register that can be read out via an SPI instruction (functional module 1). When a current measurement then needs to take place in order to detect a possible conductor interruption, the most sensitive measurement range (i.e. 3 mA in this case) is typically selected. It is now possible to sense, with the supply voltage switched on, whether a current of more than 3 mA is flowing through external sensor 6. If that is not the case, a line interruption can be deduced. If a current is flowing, the wiring harness is then intact as far as sensor 6, and a fault on the part of sensor 6 must be presumed. By way of a control instruction of functional module 1 to driver stage 2, output stage 3 is controlled and sensor 6 is arbitrarily switched on and off. A current flow through resistor 5 connected in series with sensor 6 generates a voltage drop that is conveyed through resistor 4 to amplifying device 7. The voltage is amplified and evaluated in amplifying device 7 that encompasses a Schmitt trigger. The output becomes active when the voltage exceeds a definable threshold. The signal is then conveyed to functional module 9 (PAS logic unit), which decodes the data stream.

The measurement range of the current measurement is adjustable via an adjustable reference current source 8. Reference current source 8 is made up of four individual reference current sources that can be switched on individually by actuation of switching means 8.1S, 8.2S, 8.3S, 8.4S, 8.5S. A total of sixteen different measurement regions, in the range from 3 mA to 20 mA, is thereby covered. To ensure that control unit 10 can measure the current consumption of sensor 6, it is necessary only that the output of amplifying device 7 be capable of being read out via an SPI register (functional module 1). A bit that is set here indicates that the current on the connecting conductor is above or below a definable threshold. The level of the threshold can easily be set by selecting the measurement range of amplifying device 7.

What is claimed is:

1. A safety system for vehicle occupants, comprising:
   a control unit;
   sensors situated remotely from the control unit and connected via conductors to the control unit;
   a resistor connected in series to the sensors;
   an amplifier that amplifies a voltage drop occurring at the resistor, the amplifier having an inverting input coupled to a first terminal of the resistor and a non-inverting input coupled to a second terminal of the resistor; and
   a control unit that simultaneously tests the sensors and the conductors by determining, via an output of the amplifier, whether a current consumption of the sensors exceeds a predetermined threshold, such that a result of the determining distinguishes faulty sensors from faulty conductors.

2. The safety system according to claim 1, further comprising a current measuring arrangement.

3. The safety system according to claim 1, further comprising at least one reference current source which is switchably coupled to an input of the amplifier.

4. The safety system according to claim 3, wherein the at least one reference current source includes a plurality of reference current sources.

5. The safety system according to claim 4, further comprising a switching arrangement with which the reference current sources are individually controllable.

6. The safety system according to claim 1, further comprising a controllable output stage for supplying energy to the sensors.

7. The safety system according to claim 1, further comprising:
   a first logic unit between the control unit and the amplifier, the SPI logic unit including a storage register in which a data bit is set when the output of the amplifier indicates that the current consumption exceeds the predefined threshold.

8. The safety system according to claim 7, further comprising:
   a second logic unit that receives a serial data stream from the sensors, via the output of the amplifier, in response to the current consumption rising above a baseline current consumption of the sensors.

9. The safety system according to claim 7, wherein a resistance value of the resistor is programmed to specify the baseline current consumption.

10. The safety system according to claim 1, wherein a faulty conductor is indicated when the current consumption fails to exceed the predefined threshold, and a faulty sensor is indicated when the current consumption exceeds the predefined threshold.

11. The safety system according to claim 3, wherein the at least one reference current source includes a plurality of reference current sources, the safety system further comprising:
   a plurality of switching elements, each of which is independently connectable to a corresponding one of the plurality of reference current sources to set a measurement range of a current measurement performed by the control unit, as part of the testing of the sensors and the conductors.

* * * * *